Dec. 10, 1940.  R. E. BITNER  2,224,178
CATADIOPTRICAL LENS SYSTEM
Filed May 8, 1940  2 Sheets-Sheet 1
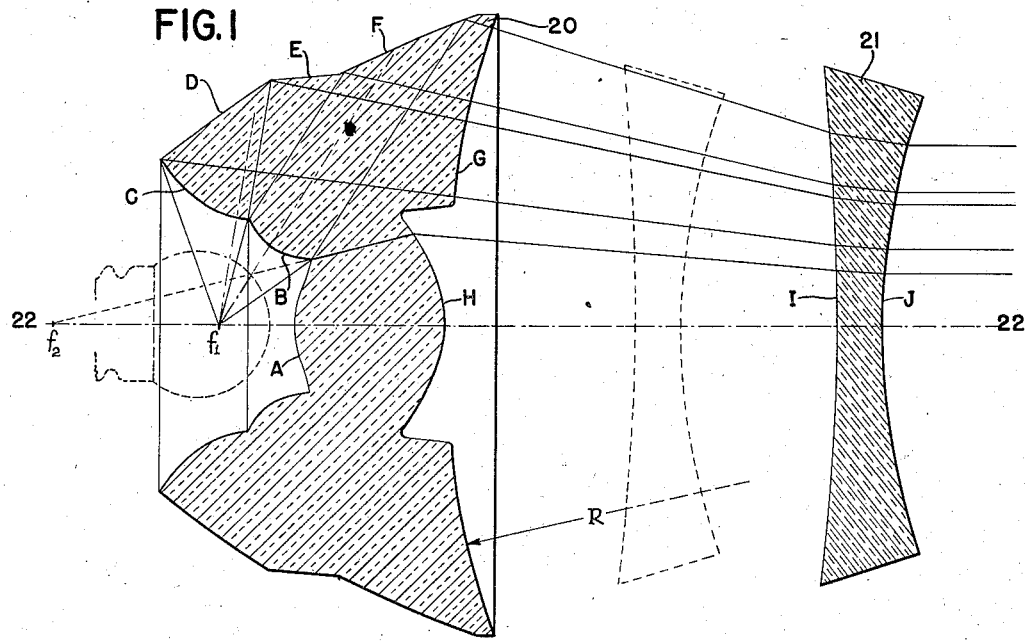
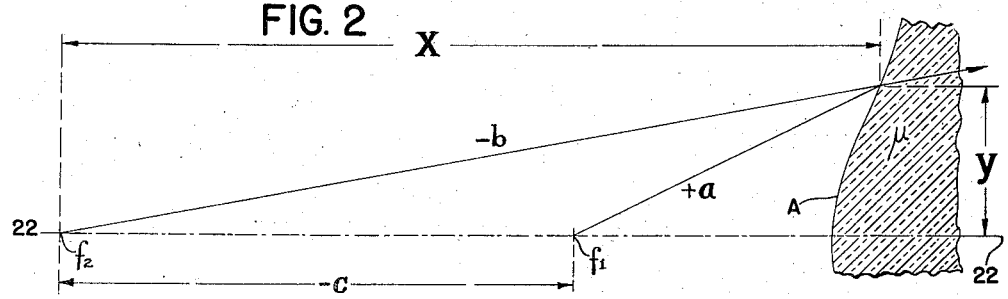
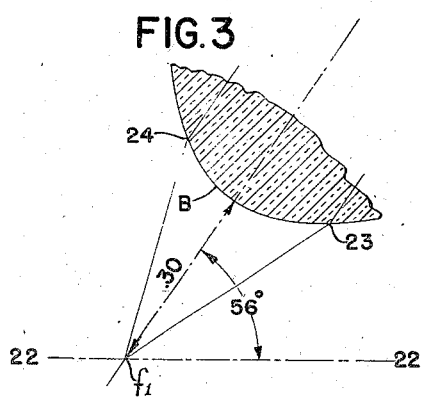
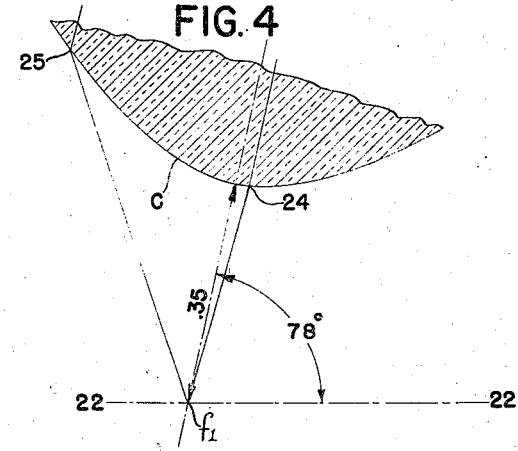
Ralph E. Bitner
INVENTOR Dec. 10, 1940.  R. E. BITNER  2,224,178
CATADIOPTRICAL LENS SYSTEM
Filed May 8, 1940  2 Sheets-Sheet 2

Ralph E. Bitner
INVENTOR

Patented Dec. 10, 1940

2,224,178

UNITED STATES PATENT OFFICE 2,224,178

CATADIOPTRICAL LENS SYSTEM

Ralph E. Bitner, New York, N. Y.

Application May 8, 1940, Serial No. 333,884

6 Claims. (Cl. 240—106.1)

This invention relates to lens units that both reflect and refract and more particularly relates to lens systems moulded from synthetic resin designed to be used in flashlights.

The use of aspherical surfaces for lens units was first proposed many years ago by some of the first investigators in optical science. It has been shown that these surfaces, called "Cartesian" surfaces, are free from spherical aberration and represent the precise geometrical form which an optical surface should have in order to transmit radiant energy, either by refraction or reflection, according to the known laws of these phenomena, accurately from one focus to the other. For a modern scientific treatment of this subject, see Southall's "Mirrors, Prisms, and Lenses," page 518.

In spite of their obvious advantages, very few lenses with these surfaces have been manufactured because of the difficulties in grinding and polishing. Recently, however, with the advent of mouldable synthetic resins of good optical qualities, it is possible to produce at a reduced cost, aspherical lenses of high quality. Such a lens is described in United States Patent No. 2,086,286 issued to N. M. Stanley, although the exact surface configuration in this case is not specified.

U. S. Patents No. 1,507,212 issued to L. Silberstein and No. 697,959 issued to Ernst Abbe, illustrate the application of an aspherical surface to part of a lens system and give mathematical equations for calculating such surfaces.

The present invention employs two lenses as a system for providing a variable convergent beam of light from a concentrated source such as a flashlight bulb or a similar signal lamp. One of these lenses consists of a block of transparent material with a cavity at one side thereof, symmetrical about the optical axis, in which the source of light is positioned. The walls of this cavity are formed with surfaces of revolution which refract the rays of light from the source and direct them through the lens block in three well defined pencils. One of these, the central or paraxial pencil, is again refracted by an exit surface and focussed at a point on the optical axis. The other pencils are first internally reflected and then pass the spherical exit surface without refraction toward the same point on the optical axis.

The second lens is a simple double concave lens which is designed to be movable along the optical axis to vary the divergence of the resultant beam from parallel rays to a 30° cone. All surfaces used are surfaces of revolution taken around the optical axis and all but two are known generally as Cartesian surfaces. Each of the lenses is designed to be moulded in a simple two piece mould of any suitable transparent material but preferably of transparent synthetic resin. Since the source is substantially surrounded by the lens it is possible to utilize the luminous flux radiated, and project it in a single beam. By designing the reflecting surfaces of the lens unit to receive the incident beams at a greater angle than the critical angle, total internal reflection is obtained without the use of silvering or any other metallic reflector.

Throughout this specification the relative position of lines and surfaces will be indicated by specifying the angle between the line and a normal to the surface.

One of the objects of the invention is to provide a lens system cast from transparent material which will focus practically all the available light rays into a single beam the divergence of which is variable.

Another object of the invention is to provide a lens system, one unit of which reflects the marginal and intermediate rays by means of total internal reflection, thereby eliminating the necessity of metallic reflectors.

Another object of the invention is to provide a lens system in which both lenses may be made of easily mouldable material having refracting and reflecting surfaces free from spherical aberration.

Another object of the invention is to provide a flashlight lens system which will gather in and focus all the available light rays from a commercial flashlight lamp.

Another object of the invention is to provide a flashlight lens system which produces a beam of variable divergence with a uniform field of illumination for all angular adjustments.

Another object of the invention is to provide an efficient lens system which has a small overall diameter in comparison to the size of the source, generally having a ratio of less than three.

Still another object of the invention is to provide a lens system, the units of which may be manufactured by automatic moulding machinery.

Other objects and structural details of the invention will be apparent from the following description when read in connection with the accompanying drawings, wherein;

Fig. 1 is a sectional view taken on a meridian plane of the lens system, showing the associated curves employed by both units.

Fig. 2 is a half sectional view showing that part of the lens block nearest the source of light.

Fig. 3 is a sectional view of the refracting entrance surface adjoining that shown in Fig. 2 with dimensions showing its focal length and axial inclination.

Fig. 4 is a sectional view of another refracting entrance surface adjoining that shown in Fig. 3 and similar to it except for focal length and axial displacement.

Figure 5:
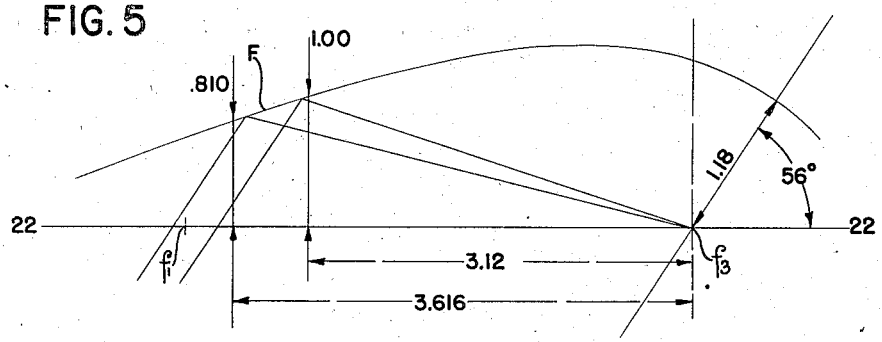
Fig. 5 is a diagram of one of the reflecting surfaces showing the characteristics of the parabola from which it is derived.

Referring now to Fig. 1, the lens system consists of a condensing block 20 and a focussing unit 21, both indicated on an optical axis 22—22 in conjunction with a source of light $f_1$ on said axis. This source may be any convenient lamp or light image but the present design is intended to be used with a small flashlight bulb. The condensing block 20 is a solid casting bounded by eight faces, all surfaces of revolution about the optical axis 22—22. These surfaces are as follows: (1) A paraxial entrance surface A consisting of an aspherical quartic surface of revolution which receives the light rays from the source $f_1$ and refracts them to a virtual focus at $f_2$. (2) A refracting entrance surface B consisting of a convex hyperboloid formed by the revolution of a section of a hyperbola about the optical axis and refracting the rays from the source $f_1$ into a beam of parallel rays. (3) A refracting entrance surface C similar to surface B except for focal length and axial inclination. (4) A reflecting surface D consisting of a paraboloid formed by the revolution of a section of a parabola about the optical axis and reflecting the parallel rays from surface C toward a focal point $f_3$ on the optical axis. (5) A part of the surface of a cone E which connects two optical surfaces but has no optical function of its own. (6) A reflecting surface F similar to D but receiving parallel rays from surface B and reflecting them by a different path toward the point $f_3$. (7) A concave exit surface G consisting of part of the surface of a sphere having its center at the point $f_3$ and permitting the light rays from surfaces D and F to pass out of the lens block without change of direction. (8) A refracting paraxial exit surface H formed by the revolution of a section of a quartic curve about the optical axis and refracting the light rays coming in the direction from the virtual focus $f_2$ to a focus at the point $f_3$ on the optical axis.

The focussing unit 21 is a double concave negative lens with two refracting surfaces. The first of these is a refracting entrance surface I which receives the light rays traveling toward the point $f_3$ and refracts them (when in its extended position) into a beam with a virtual focus at $f_4$ on the optical axis. Surface I is a surface of revolution of a quartic curve. The second or exit surface J of the focussing unit is part of the surface of revolution of an ellipse which refracts the rays, traveling toward the point $f_4$, into a parallel beam of light.

Each of the above mentioned ten surfaces will now be considered in detail and methods and means for their computation disclosed. Three surfaces, A, H, and I are formed by revolving a quartic curve about the optical axis, hence the computations involved informing these curves will be disclosed. The resultant curvature is far from a spherical surface and may change its curvature from convex at the axis to concave at the margin. The equation of this curve as generally expressed in terms of the coordinates of any point on the curve, is a complicated fourth degree equation and is very difficult to compute. Silberstein in Patent 1,507,212 gives an approximate method of solution by expansion into a series. I prefer, however, to calculate such curves by using a parametric form with the length of optical path as the parameter. In accordance with the fundamental concepts of image formation, this equation is $$G = a + \mu b$$

where $a$ is the length of the path in air, $b$ the length of the path in the refracting medium, $\mu$ the refractive index, and $G$ a constant quantity. When a virtual image is formed as in the case of surface A, the length $b$ is measured from the refracting surface back to the point $f_2$ and hence is considered as a negative quantity. Hence the equation becomes $$G = a - \mu b$$

This equation also holds for surface I.

Figure 8:
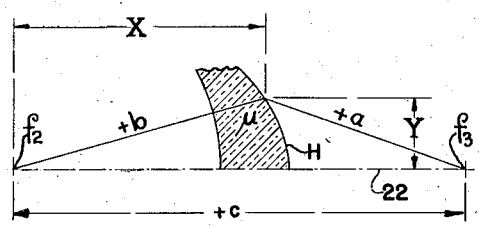
Fig. 8 is a sectional view of the paraxial exit surface showing the characteristics of the quartic surface from which it is derived.
Figure 9:
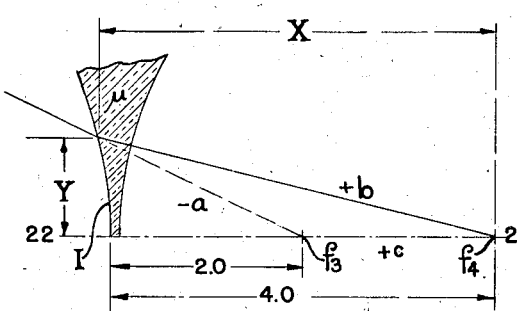
Fig. 9 is a sectional view of the entrance surface of the focussing lens.

From the geometrical construction as shown in Figs. 2, 8, and 9, it will be obvious that the following relations are true:

$$a^2 = b^2 + c^2 - 2bc \cdot \cos \alpha$$
$$X = b \cdot \cos \alpha$$
$$X^2 + Y^2 = b^2$$

where $c$ is the distance between the foci and $\alpha$ the ray angle.

By suitable rearrangement we get:

$$X = \frac{c^2 - a^2 + b^2}{2c}$$

$$Y = \sqrt{b^2 - X^2}$$

where X and Y are the coordinates of any point on the required curve and the parametric quantity $b$ is defined by the equation $$b = \frac{a - G}{\mu}$$

This series of equations may be used to compute the points on the refracting surface and a much simpler and shorter computation results. It has one disadvantage over the older method in that neither the value of X or Y is known at the start of the computation. This feature is of no consequence, however, when a curve is to be computed with a large number of points.

The lens units herein disclosed were designed for a lens material having an index of refraction equal to 1.52. It will be obvious that other similar lenses may be designed within the scope of this invention which have different indices of refraction.

The following table gives some of the computed values of the three quartic surfaces.

| A | | H | | I | |
|---|---|---|---|---|---|
| X | Y | X | Y | X | Y |
| .0013349 | .0280014 | .0146783 | .0103146 | .0031438 | .1658477 |
| .0052929 | .0568474 | .0306410 | .1428755 | .0062590 | .2352149 |
| .0146095 | .0819819 | .0441331 | .1744678 | .0124046 | .3344035 |
| .0204228 | .1203594 | .0589098 | .2008510 | .0184366 | .4117254 |
| .0321733 | .1603335 | .0885625 | .2444510 | .0243556 | .4778243 |
| .0420819 | .1930955 | .1183465 | .2804319 | .0358530 | .5914512 |
| .0473138 | .2105679 | .1783096 | .3387008 | .0468966 | .6897958 |

Figure 3 shows the construction of a convex refracting surface B which adjoins the paraxial surface A shown in Fig. 2. Surface B receives light rays from the source $f_1$ on the optical axis and refracts them into a parallel beam. The curve is a hyperbola with its apex .3 unit from the source and an eccentricity of 1.52. The portion of the hyperbola used in the lens block is designated by the line drawn between points 23 and 24, and the angular tilt of 56° given the axis is to assure easy withdrawal of the die during the moulding operation.

Fig. 4 shows the construction of a hyperbola similar to the one shown in Fig. 3 except for focal length and axial tilt. As may be seen in Fig. 1, this refracting surface adjoins the surface B. Its axis is inclined 78° from the optical axis of the lens block with the apex .35 unit from the source of light $f_1$. The line between the points 24 and 25 denotes the segment used in the unit. The eccentricity of this hyperbola is also 1.52.

Figure 6:
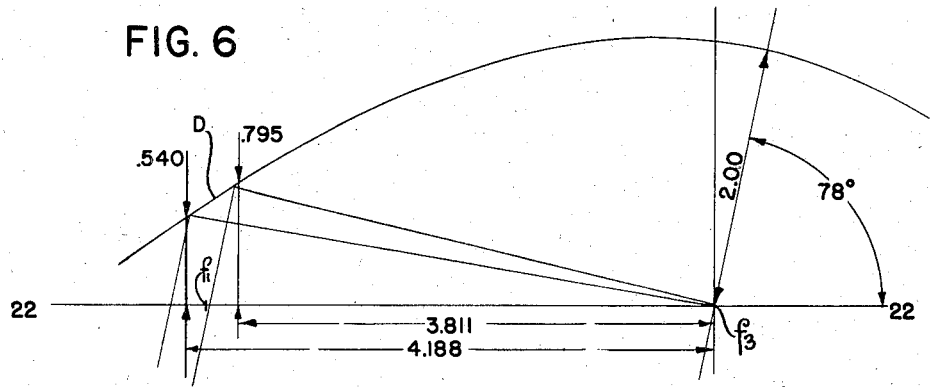
Fig. 6 is a diagram of the second reflecting surface similar to Fig. 5 except for axial displacement and focal length.

Figs. 5 and 6 show the characteristics of a pair of parabolas which are used to form surfaces of revolution about the optical axis. The use of paraboloids as focussing means is quite old in the flashlight art but previous structures have placed the light source at or near the focus of the paraboloid to obtain a reflected parallel beam without subsequent refraction. The present design uses the paraboloid in a reverse manner since the parallel light rays are received by the mirror and reflected toward the focal point $f_3$. The direction of light propagation with respect to the paraboloid is, therefore, opposite to that in general usage.

The primary reason for employing the paraboloids in this manner is to save space. If the older design were employed, the resultant diameter of the lens block would be greatly increased. Another advantage of using paraboloids for point focussing is due to the fact that the resultant light beam is more concentrated as it leaves the lens and therefore permits the formation of a smaller and more intense spot of light.

It will be obvious from the drawings (Figs. 1, 3, and 5) that the hyperboloid B and the paraboloid F cooperate to direct the same rays of light from the source $f_1$ toward a point $f_3$ on the axis. These points are spaced 4 units apart. The hyperboloid B is formed with its axis 56° from the optical axis, hence the axis of the paraboloid F is similarly disposed.

The dimensions as indicated in all the figures are in units of any system of measurement, the radius of the circle forming the exit edge of the condensing block being taken as one.

The refracting hyperboloid C and the reflecting paraboloid D, as shown in Figs. 1, 4, and 6, also cooperate to direct another group of light rays from the source $f_1$ toward the point $f_3$. Both of these sections have the same axial inclination, 78°, this value being the result of an effort to keep the reflecting angle in the paraboloid well within the limit for total internal reflection and at the same time gather in as much light from the source as possible. The limiting angle for total reflection in a medium with a refractive index of 1.52 is 41° 8′ 20″.

Figure 7:
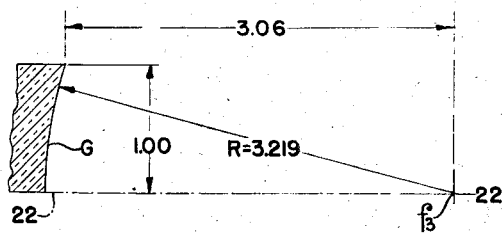
Fig. 7 is a sectional view of the spherical exit surface with dimensions showing its position and curvature.

Fig. 7 illustrates the position of the spherical exit surface G. Light rays from the reflecting surfaces D and F leave the condensing lens block at the surface G on their way toward the focal point $f_3$. Surface G is therefore made part of a sphere with its center at $f_3$ so there will be no change in direction as the rays emerge and a minimum of reflection.

Fig. 8 shows the position and characteristics of the paraxial exit surface H which refracts the light rays from the virtual focus $f_2$ toward the focal point $f_3$. It is formed by the revolution of a quartic curve, the calculation of which was disclosed above.

The condensing lens block when used alone would focus all the light at the point $f_3$. The focussing lens unit 21 is designed, as previously stated, to cooperate with the condensing block to produce a parallel beam or a divergent beam up to 30° divergence from the optical axis. Fig. 9 shows the characteristics of the entrance surface I which is formed by the revolution of a quartic curve. The rays are refracted toward a point $f_4$ (when lens 21 is in its extended position) which lies 2 units beyond the point $f_3$ so that the rays are deviated substantially one-half of their original axial angle. The method of computing this curve was discussed above.

Figure 10:
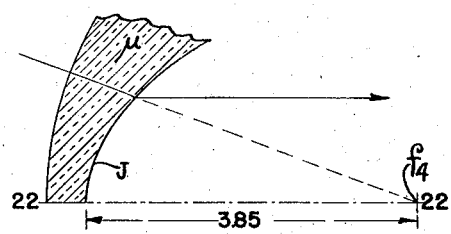
Fig. 10 is a sectional view of the exit surface of the focussing lens showing the characteristics of the ellipse from which it is derived.

Fig. 10 shows the characteristics of the exit surface J which is part of an ellipsoid having an eccentricity of .6579 or the reciprocal of 1.52. The lens thickness is .15 unit at the axis while the radius is .8 unit. The ellipse which forms surface J has a major axis of 2.3222 units and a minor axis of 1.7488 units.

The focussing lens 21 is designed to handle the light beam with a minimum of aberrations when the resultant beam is parallel. As the focussing lens is moved toward the condensing block, the aberrations will increase, while at the position indicated by dotted lines in Fig. 1 they may be quite large. This makes little difference to the illuminated spot of light since the beam which causes it is divergent and the aberration effects are lost in the general illuminated area.

The dotted lines in Fig. 1 indicate the position of the focussing lens when it is desired to produce a divergent beam of 30° on each side of the optical axis. Manual focussing means, not shown in drawings, but well known to the art are to be used when adjusting lens 21 to obtain the required divergent beam.

While I have described what I consider to be a highly desirable embodiment of my invention, it is obvious that many changes in form could be made without departing from the spirit of my invention, and I, therefore, do not limit myself to the exact form herein shown and described nor to anything less than the whole of my invention as hereinbefore set forth, and hereinafter claimed.

I claim,

1. An optical system for focussing light from a concentrated source into a variably divergent beam, having in combination, a catadioptrical lens block and a movable paraxial negative lens; said lens block comprising a paraxial lens, an intermediate lens-mirror combination, and a marginal lens-mirror combination; said paraxial lens having quartic entrance and exit surfaces; said intermediate lens-mirror combination comprising a hyperboloid entrance surface, a paraboloid total internal reflection mirror, and a spherical concave exit surface; said marginal lens-mirror combination comprising a hyperboloid entrance surface having a focal length which is substantially longer than the first mentioned hyperboloid, a paraboloid total reflection mirror, and a concave spherical exit surface.

2. An optical system for focussing light from a concentrated source into a variably divergent beam, having in combination, a catadioptrical lens block and a movable paraxial negative lens; said lens block comprising a paraxial positive lens, an intermediate lens-mirror combination and a marginal lens-mirror combination; said paraxial lens having quartic entrance and exit surfaces; said intermediate lens-mirror combination composed of a hyperboloid refracting entrance surface, a paraboloid total internal reflection mirror and a concave spherical exit surface, the axes of said hyperboloid and said paraboloid disposed at equal angular inclinations to the optical axis of the block; said marginal lens-mirror combination composed of a hyperboloid refracting entrance surface, a paraboloid total internal reflecting mirror, and a concave spherical exit surface, the axes of said hyperboloid and said paraboloid disposed at equal angular inclinations to the optical axis of the block; the first mentioned angular inclination being substantially less than the second mentioned inclination; said second concave spherical exit surface being a continuation of the first mentioned concave spherical exit surface and all of said surface components being surfaces of revolution about the optical axis.

3. An optical system for focussing light from a concentrated source into a variably divergent beam, having in combination, a catadioptrical lens block and a movable paraxial negative lens; said lens block comprising a paraxial positive lens, an intermediate lens-mirror combination and a marginal lens-mirror combination; said paraxial positive lens having quartic entrance and exit surfaces; said intermediate lens-mirror combinations composed of a hyperboloid refracting entrance surface, a paraboloid total internal reflection mirror, and a concave spherical exit surface, the axes of said hyperboloid and said paraboloid disposed at equal angular inclinations to the optical axis of the block; said marginal lens-mirror combinations composed of a hyperboloid refracting entrance surface, a paraboloid total internal reflecting mirror, and a concave spherical exit surface, the axes of said hyperboloid and said paraboloid disposed at equal angular inclinations to the optical axis of the block, the first mentioned angular inclination being substantially less than the second mentioned inclination.

4. A lens system for focussing light from a concentrated source into a variably divergent beam having in combination, a catadioptrical lens block for focussing light rays at a point not more than ten times the diameter of the lens block from the source and a negative lens adjustably positioned between the block and said focal point; said lens block comprising a quartic convex paraxial entrance surface, two hyperboloid entrance surfaces whose axes are disposed at unequal angular inclinations to the optical axis of the lens block, two paraboloid total internal reflecting surfaces whose axes are parallel to the axes of said cooperating hyperboloids, a spherical concave exit surface, and a paraxial convex quartic exist surface; said negative lens comprising a quartic concave entrance surface and an ellipsoid concave exit surface; all of said surfaces being surfaces of revolution about the optical axis of the lens system.

5. A lens system for focussing light from a concentrated source into a variably divergent beam having in combination, a catadioptrical lens block for focussing light rays at a point not more than ten times the diameter of the lens block from the source and a negative lens adjustably positioned between the block and said focal point; said lens block comprising, a quartic convex paraxial entrance surface, an intermediate hyperboloid entrance surface having an axis which is disposed at an angle to the optical axis of the block, a marginal hyperboloid entrance surface having an axis which is disposed at a substantially greater angle to the axis of the lens block than the intermediate hyperboloid, a marginal paraboloid having an axis parallel to the axis of said marginal hyperboloid, an intermediate paraboloid having an axis parallel to the axis of said intermediate hyperboloid, a spherical concave exit surface, and a paraxial convex quartic exit surface; said negative lens comprising a quartic concave entrance surface and an ellipsoid concave exit surface; all of said surfaces being surfaces of revolution about the optical axis of the lens system.

6. A lens system for focussing light from a concentrated source into a variably divergent beam having in combination a catadioptrical lens block for focussing light rays at a point not more than ten times the diameter of the lens block from the source and a negative lens adjustably positioned between the block and said focal point; said lens block comprising, a quartic convex paraxial entrance surface, an intermediate hyperboloid entrance surface having an axis which is disposed at an angle to the optical axis of the block, a marginal hyperboloid entrance surface having an axis which is disposed at a substantially greater angle to the axis of the lens block than the intermediate hyperboloid, a marginal paraboloid having an axis parallel to the axis of said marginal hyperboloid, an intermediate paraboloid having an axis parallel to the axis of said intermediate hyperboloid, a spherical concave exit surface and a paraxial concave quartic exit surface; all of said surfaces being surfaces of revolution about the optical axis of the lens system.

RALPH E. BITNER.